United States Patent
Tamma

(10) Patent No.: US 11,019,072 B2
(45) Date of Patent: *May 25, 2021

(54) CONTENT MANAGEMENT BASED ON SPATIAL AND TEMPORAL INFORMATION

(71) Applicant: Microsoft Technology Licensing, LLC, Redmond, WA (US)

(72) Inventor: Leela S Tamma, San Ramon, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/681,723

(22) Filed: Nov. 12, 2019

(65) Prior Publication Data
US 2020/0162479 A1 May 21, 2020

Related U.S. Application Data

(63) Continuation of application No. 15/444,391, filed on Feb. 28, 2017, now Pat. No. 10,491,602.

(51) Int. Cl.
*H04L 29/06* (2006.01)
*H04L 29/08* (2006.01)
*H04W 4/021* (2018.01)

(52) U.S. Cl.
CPC ............ *H04L 63/107* (2013.01); *H04L 67/18* (2013.01); *H04W 4/021* (2013.01); *H04L 63/0428* (2013.01); *H04L 63/0861* (2013.01); *H04L 67/42* (2013.01)

(58) Field of Classification Search
CPC ... H04L 63/107; H04L 67/18; H04L 63/0861; H04L 63/0428; H04L 67/42; H04W 4/021
See application file for complete search history.

(56) References Cited

U.S. PATENT DOCUMENTS

| | | | |
|---|---|---|---|
| 6,370,629 B1* | 4/2002 | Hastings | G06F 21/6218 711/163 |
| 7,092,943 B2* | 8/2006 | Roese | G01S 5/02 |
| 7,353,533 B2* | 4/2008 | Wright | H04L 63/0492 726/1 |
| 8,086,536 B2 | 12/2011 | Dublish et al. | |
| 8,595,788 B2* | 11/2013 | Lim | H04L 67/42 726/1 |
| 9,058,495 B2* | 6/2015 | Brannon | G06F 21/10 |
| 9,208,302 B2* | 12/2015 | Kannavara | G06F 21/00 |

(Continued)

OTHER PUBLICATIONS

U.S. Appl. No. 15/444,391, U.S. Pat. No. 10,491,602, filed Feb. 28, 2017, Content Management Based on Spatial and Temporal Information.

*Primary Examiner* — J. Brant Murphy
(74) *Attorney, Agent, or Firm* — Schwegman Lundberg & Woessner, P.A.

(57) ABSTRACT

Techniques for providing content management based on spatial and temporal information are disclosed herein. In an example, a service provides content management based on properties determined from a schedule of a user. The schedule of the user is processed to identify a geo-fenced area assigned for performing a task. Upon determining that the location of the client device as within the geo-fenced area, content identified by the task may be accessed through the client to perform the task.

20 Claims, 7 Drawing Sheets

(56) References Cited

U.S. PATENT DOCUMENTS

| | | | |
|---|---|---|---|
| 9,392,460 B1 | 7/2016 | Blake et al. | |
| 9,430,624 B1* | 8/2016 | Mortensen | G06F 21/35 |
| 9,509,676 B1* | 11/2016 | Johnson | G06F 21/35 |
| 2006/0059096 A1* | 3/2006 | Dublish | H04L 63/10 |
| | | | 705/57 |
| 2008/0096529 A1* | 4/2008 | Zellner | H04L 67/18 |
| | | | 455/411 |
| 2013/0061307 A1* | 3/2013 | Livne | H04W 12/08 |
| | | | 726/7 |
| 2013/0124186 A1* | 5/2013 | Donabedian | H04L 67/025 |
| | | | 704/2 |
| 2014/0123273 A1* | 5/2014 | Matus | H04L 63/101 |
| | | | 726/17 |
| 2014/0309982 A1* | 10/2014 | Ricci | G06F 3/0637 |
| | | | 704/3 |
| 2015/0148061 A1* | 5/2015 | Koukoumidis | H04W 4/022 |
| | | | 455/456.1 |
| 2015/0169893 A1* | 6/2015 | Desai | H04L 51/18 |
| | | | 726/1 |
| 2015/0229644 A1* | 8/2015 | Nozawa | H04L 63/107 |
| | | | 726/4 |
| 2015/0286976 A1* | 10/2015 | Hirschfeld | H04L 67/02 |
| | | | 705/7.26 |
| 2015/0334562 A1* | 11/2015 | Perold | H04W 12/06 |
| | | | 713/171 |
| 2015/0347734 A1* | 12/2015 | Beigi | H04L 9/3231 |
| | | | 713/155 |
| 2016/0014457 A1* | 1/2016 | Dua | H04N 21/43615 |
| | | | 725/25 |
| 2016/0080943 A1* | 3/2016 | Ives-Halperin | H04L 63/0861 |
| | | | 713/168 |
| 2016/0253889 A1* | 9/2016 | Keyton | G08B 21/22 |
| | | | 340/539.13 |
| 2016/0266733 A1* | 9/2016 | Alon | G06Q 10/10 |
| 2016/0267485 A1* | 9/2016 | Walz | H04W 4/021 |
| 2017/0245105 A1* | 8/2017 | Connelly | H04W 4/021 |

\* cited by examiner

CONTENT MANAGEMENT BASED ON SPATIAL AND TEMPORAL INFORMATION

BACKGROUND

Information exchange have changed processes associated work and personal environments. Automation and improvements in processes have expanded scope of capabilities offered for personal and business consumption. With the development of faster and smaller electronics, execution of mass processes at cloud systems have become feasible. Indeed, applications provided by data centers, data warehouses, data workstations have become common features in modern personal and work environments. Such systems execute a wide variety of applications ranging from enterprise resource management applications to content management tools.

Increasingly, cloud based content providers are utilized for providing content to client device(s) associate with user(s), where the cloud based content providers have client interface(s) that automatically track activity(s) associated with the user(s). However, there are currently significant gaps when managing content in relation to activity(s) performed by the user(s). Personnel resources are unnecessarily consumed to manage content related to activity(s) of the user(s). Lack of relevant activity based content management schemes lead to poor management of personnel resources when attempting to tailor content management in relation to activity(s) of the user(s).

SUMMARY

In an example, a method performed by a data processing system for providing content management includes receiving a location of a client device and an identifier associated with a user of the client device; parsing schedule data representing a schedule of the user to identify a task assigned to the user; based on the identified task, identifying designated content for the task; determining, based on the task assigned to the user, a geo-fenced area for performing the task; determining that the location of the client device is within the geo-fenced area; verifying an identity of the user; and causing access to be enabled for the designated content on the client device in response to verifying the identity of the user and determining that the location of the client device is within the geo-fenced area for performing the task.

In another example, a system for providing content management includes one or more hardware processors and a memory. The memory stores instructions, which when executed, cause the one or more hardware processors to perform operations including: receiving a location of a client device and an identifier associated with a user of the client device; parsing schedule data representing a schedule of the user to identify a task assigned to the user; based on the identified task, identifying designated content for the task; determining, based on the task assigned to the user, a geo-fenced area for performing the task; determining that the location of the client device is within the geo-fenced area; verifying an identity of the user and causing access to be enabled for the designated content on the client device in response to verifying the identity of the user and determining that the location of the client device is within the geo-fenced area for performing the task.

In another example, a data processing system for providing content management includes means for receiving a location of a client device and an identifier associated with a user of the client device; means for parsing schedule data representing a schedule of the user to identify a task assigned to the user; means for identifying designated content for the task based on the identified task; means for determining, based on the task assigned to the user, a geo-fenced area for performing the task means for determining that the location of the client device is within the geo-fenced area; means for verifying an identity of the user; and means for causing access to be enabled for the designated content on the client device in response to verifying the identity of the user and determining that the location of the client device is within the geo-fenced area for performing the task.

Embodiments are directed to content management based on spatial and temporal information. A hosted service, according to embodiments, may initiate operations to provide content management based on spatial and temporal information upon receiving a location of a client device and an identifier associated with a user of the client device. A schedule of the user may be processed to identify a geo-fenced area assigned to the user during a designated time-period. Upon detecting the location of the client device as within the geo-fenced area during the designated time-period, content may be provided to the client device.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
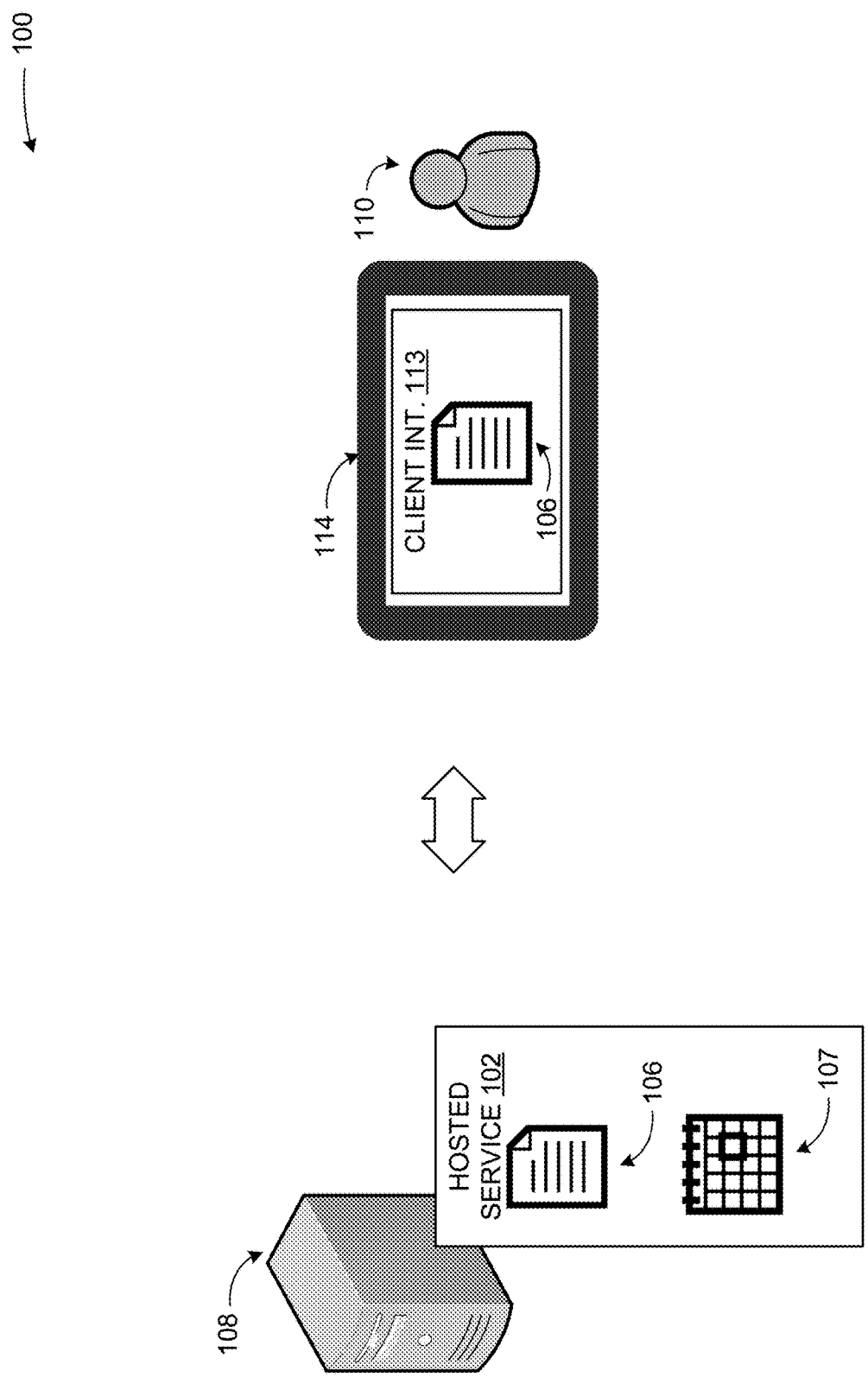
FIG. 1 is a conceptual diagram illustrating examples of providing content management based on spatial and temporal information, according to embodiments.

As briefly described above, a hosted service may provide content management based on location and temporal information. In an example scenario, the hosted service may restrict an access to a content based on a location of a user in relation to a task assigned to the user and a time-slot of the task. The hosted service may evaluate the access to the content upon receiving a location of a client device and an identifier associated with a user of the client device. The client device may be assigned to the user. A biometric identifier of the user may be received as the identifier associated with the user. The biometric identifier may be further processed to authenticate the user and to verify that the client device is in possession of the user. As such, temporal and spatial information from the client device may be used to track activity(s) of the user and trigger event(s) associated with the activity(s).

For example, a schedule of the user may be processed to identify a geo-fenced area assigned to the user during a designated time-period. The schedule may be provided by a manager of the user. The geo-fenced area may be provided as a property of a task assigned to the user on the schedule. The designated time-period may include a timespan that encompasses time-slot(s) associated with task(s) assigned to the user. Next, the location of the client device may be compared to the geo-fenced area to detect the location as within the geo-fenced area during the designated time-period. A presence of the user within the geo-fenced area during the designated time-period may be correlated to activity(s) performed in service of the task on the schedule. Upon verifying the location of the user (as within the geo-fenced area during the designated time-period), the content may be provided to the client device.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing content management based on spatial and temporal information. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

FIG. 1 is a conceptual diagram illustrating examples of providing content management based on spatial and temporal information, according to embodiments.

In a diagram 100, a server 108 may execute (or provide) a hosted service 102. The server 108 may include a physical server providing service(s) and/or application(s) to client devices. A service may include an application performing operations in relation to a client application and/or a subscriber, among others. The server 108 may include and/or is part of a workstation, a data warehouse, a data center, and/or a cloud based distributed computing source, among others.

The server 108 may execute the hosted service 102. The hosted service 102 may restrict access to a content based on a location of a user 110 in relation to a task 107 assigned to the user 110 and a time-slot of the task 107. The hosted service 102 may initiate operations to provide content management upon receiving a location of a client device 114 and an identifier associated with a user 110 of the client device from a client interface 113 (of the hosted service 102). The client interface 113 may be provided by the hosted service 102 to collect information about a user 110 (such as spatial and temporal information). The client device 114 may render the client interface 113.

The client device 114 may be assigned to the user 110. The client interface 113 may scan an identifier of the user 110 such as a biometric identifier (in response to an event to authenticate the user 110). The biometric identifier may be processed to authenticate the user 110 and to verify that the client device 114 is in possession of the user. As a result, temporal and spatial information from the client device 114 may be used to track activity(s) of the user 110 and trigger event(s) associated with the activity(s).

For example, a schedule of the user may be processed to identify a geo-fenced area assigned to the user 110 during a designated time-period. The geo-fenced area may include a virtual area defined by coordinates or through a partition of a structure (such as a room within a building). The schedule may be provided by a manager of the user. The geo-fenced area may be provided as a property of a task 107 assigned to the user on the schedule. The designated time-period may include a timespan that encompasses time-slot(s) of task(s) assigned to the user 110. Next, the location of the client device 114 may be compared to the geo-fenced area to detect the location as within the geo-fenced area during the designated time-period.

A presence of the user 110 within the geo-fenced area during the designated time-period may be correlated to activity(s) performed in service of the task 107 on the schedule. Upon verifying the location of the user 110 (as within the geo-fenced area during the designated time period), a content 106 may be provided to the client device 114. The content may include document(s) that have access restriction(s) based on property(s) of the task 107 assigned to the user 110. An example of the property of the task may include an access restriction to the content such as a rule to validate a presence of the user detected within the geo-fenced area (assigned to the task 107) during a time-slot of the task 107.

The server 108 may communicate with the client device 114 through a network. The network may provide wired or wireless communications between network nodes such as the client device 114 and/or the server 108, among others. Previous example(s) to provide content management based on spatial and temporal information are not provided in a limiting sense. Alternatively, the hosted service 102 may provide the content 106 to the user 110 as a desktop application, a workstation application, and/or a server application, among others. The client interface 113 may also include a client application interacting with the hosted service 102.

The user 110 may interact with the client interface 113, respectively, with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the server 108, the hosted service 102, embodiments are not limited to these components or system configurations and can be implemented with other system configuration employing fewer or additional components.

Figure 2:
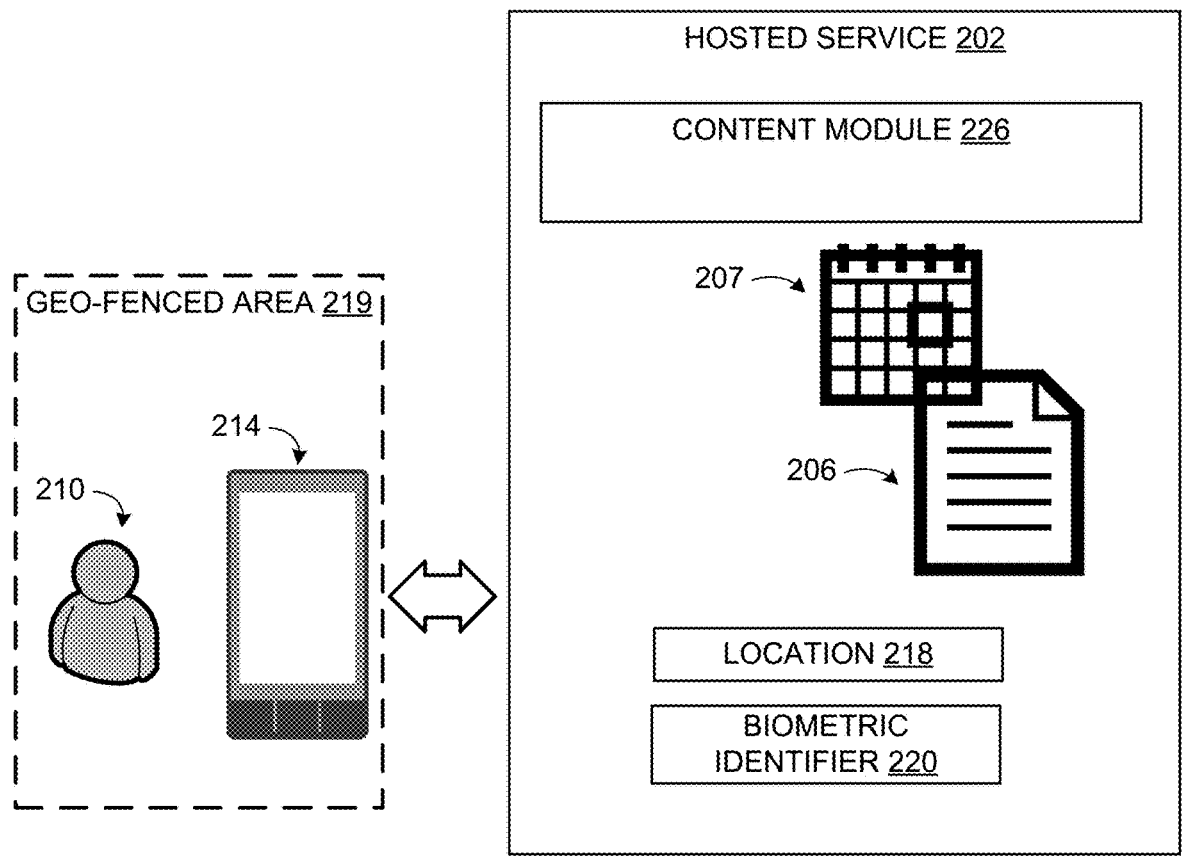
FIG. 2 is a display diagram illustrating example components of a hosted service that provides content management based on spatial and temporal information, according to embodiments.

FIG. 2 is a display diagram illustrating example components of a hosted service that provides content management based on spatial and temporal information, according to embodiments.

As illustrated in diagram 200, a content module 226 of a hosted service 202 may receive a location 218 from a client interface of the hosted service 202 rendered by a client device 214. The client device 214 may execute the client interface to track spatial, temporal, and/or other information associated with a user 210. The user 210 may be assigned the client device (which may include a mobile device such as a smart phone) for use in activity(s) associated with a task 207 assigned to the user 210.

The client interface of the hosted service 202 may report a location 218 of the client device 214 to the content module 226. The location may be refreshed periodically or based on an on-demand request and reply scheme (or a push and pull scheme). Furthermore, the content module may receive a schedule of the user 210 which may include the task 207. The task 207 may include activity(s) such as a work shift (among other activities) associated with the user 210. For example, the content module 226 may analyze the task 207 to detect a geo-fenced area 219 as a property of the task 207 (such as coordinates for a work-site in which the user 210 is expected to perform the task 207). During a time-slot of the task 207, the content module 226 may compare the location 218 of the client device 214 to the geo-fenced area 219.

If the location 218 is detected as within the geo-fenced area 219 during the time-slot for the task 207, the content module 226 may continue with authenticating the user 210 to grant an access to a content 206 associated with the task. The user 210 may be authenticated with a biometric identifier 220 scanned by the client interface and provided to the content module 226. The biometric identifier 220 may be compared to a biometric information of the user 210 retrieved from a profile of the user 210 hosted by a personnel data source. The personnel data source may include a human resources data provider that manages confidential information associated with user(s). The user 210 may be verified as in possession of the client device 214 when the biometric identifier 220 is matched to the retrieved biometric information.

Upon verification of the location 218 and the biometric identifier 220 during the time-slot of the task 207, the content 206 associated with the task 207 may be provided to the user 210. The content 206 may include document(s) associated with the task 207 which the user 210 may need to complete the task 207 (such as technical document(s) related to the task 207). In an example scenario, the user 210 may be granted an access to the content 206. The access may be restricted to read, write, copy, and/or other access type that limits the user's access to the content 206. The access to the content 206 may also be restricted to the time-slot of the task 207 after which the access to the content 206 may be revoked.

Figure 3:
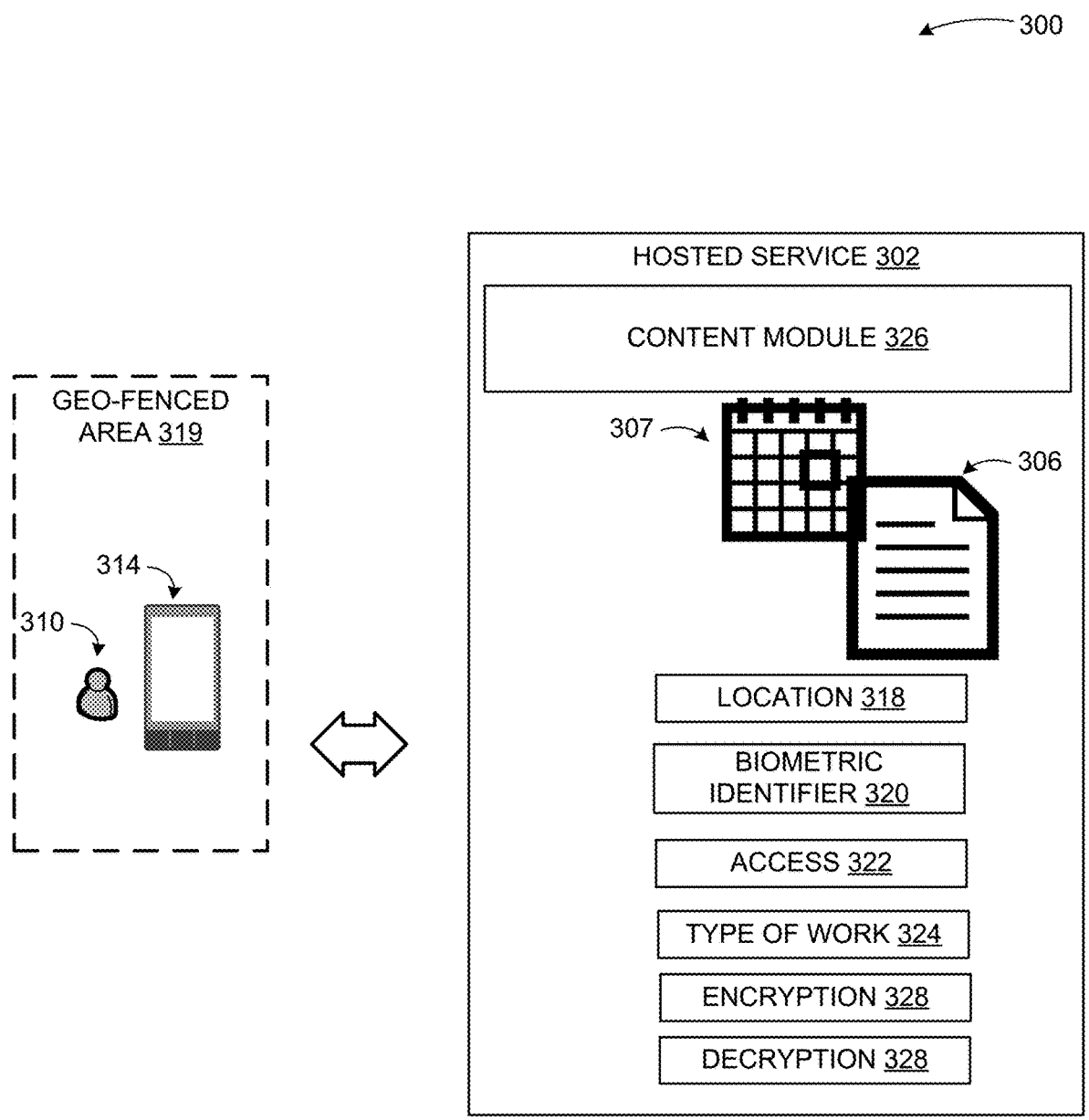
FIG. 3 is a display diagram illustrating components of a scheme to provide content management based on spatial and temporal information, according to embodiments.

FIG. 3 is a display diagram illustrating components of a scheme to provide content management based on spatial and temporal information, according to embodiments.

As shown in a diagram 300, a content module 326 of a hosted service 302 may verify a presence of a user 310 through a client device 314 carried by the user 310. For example, the user may be verified as present during a task 307 by tracking a location 318 of the client device 314. A continued presence of the client device 314 on the user 310 may be confirmed through a verification of a biometric identifier 320 of the user 310 scanned by the client device 314. In an example scenario, a task 307 within a schedule of the user 310 may trigger one or more verification processes to provide a content 306 to the user 310 during a time-slot of the task 307. For example, the user 310 be provided access to work related technical documents during a shift.

The work related technical documents may be confidential and a manager of the user 310 may restrict an access 322 to the content 306 by incorporating the access 322 to the content 306 as a property of the task 307. The access 322 may be further qualified by a manager of the user 310. The user 310 may be allowed to limit the access 322 to read access, write access, and/or copy access, among others.

In an example scenario, operations to grant the access 322 to the content 306 may be initiated when a client interface of the hosted service 302 may provide the location of the user 310 to the hosted service 302. The client device 314 may render the client interface through which attributes associated with the user 310 may be tracked. The geo-fenced area 319 may be designated as a property of the task 307 defining where activity(s) related to the task 307 may be performed during a time-slot associated with the task 307. For example, the location 318 of client device 314 may be compared to the geo-fenced area 319 during the time-slot of the task 307 to confirm a presence of the user 310 within the geo-fenced area 319 during the time-slot of the task 307.

Upon verifying the location 318 as within the geo-fenced area 319 during the time-slot of the task 307, a biometric identifier 320 of the user 310 (scanned by the client device 314) may be compared to a biometric information of the user 310 (retrieved from a profile of the user 310 hosted by a personnel data source). For example, the biometric information associated with the user 310 (such as an iris pattern, a fingerprint, a palm pattern, a face pattern, a voice pattern, and/or an ear pattern, among others) may be stored as biometric information of the user while creating the profile of the user 310.

Upon verifying the biometric identifier 320 as matching the biometric information, the access 322 to the content 306 may be granted to the user 310. The access 322 to the content 306 may be restricted to the time-slot of the task 307. As such, the access 322 may not be available before the time-slot of the task 307 or may be revoked upon an expiration of the time-slot of the task 307. Upon, a revocation of the access 322, the content module 326 may transmit an instruction to the client device 314 to remove the content 306. Alternatively, the content module 326 may instruct the client device 314 to block the access 322 to the content 306 but continue to store the content 306 for future access to the content 306. The client interface rendered on the client device 314 may be instructed to employ an encryption scheme 328 to block the access 322 to the content 306 (locally stored) or use a decryption scheme 329 to grant the access 322 to the content 306 (locally stored previously).

Alternatively, the content module 326 may transmit the content 306 to the client interface as encrypted. Upon verifying the location 318 and the biometric identifier 320, the content module 326 may transmit an instruction to the client interface to decrypt the content 306 for consumption by the user 310. Similarly, upon a condition to revoke the access 322, the content module 326 may transmit an instruction to the client interface to encrypt the content 306 to prevent access to the content 306 by the user 310.

Furthermore, the access 322 to the content 306 may be restricted based on a type of work 324. For example, the manager may assign a type of work to the task 307. The content module 326 may compare the type of work assigned to the task 307 to the type of work 324 restricting the access 322 to the content 306. If the type of work assigned to the task 307 match the type of work restricting the access 322 to the content 306 then the access 322 to the content 306 may be granted to the user 310. Otherwise, the access 322 to the content 306 may continue to be restricted to the user 310. The manager may be allowed to define a restriction to access the content 306 based on the type of work 324 to prevent an unqualified user (or a user lacking the necessary skills) access to the content 306.

Figure 4:
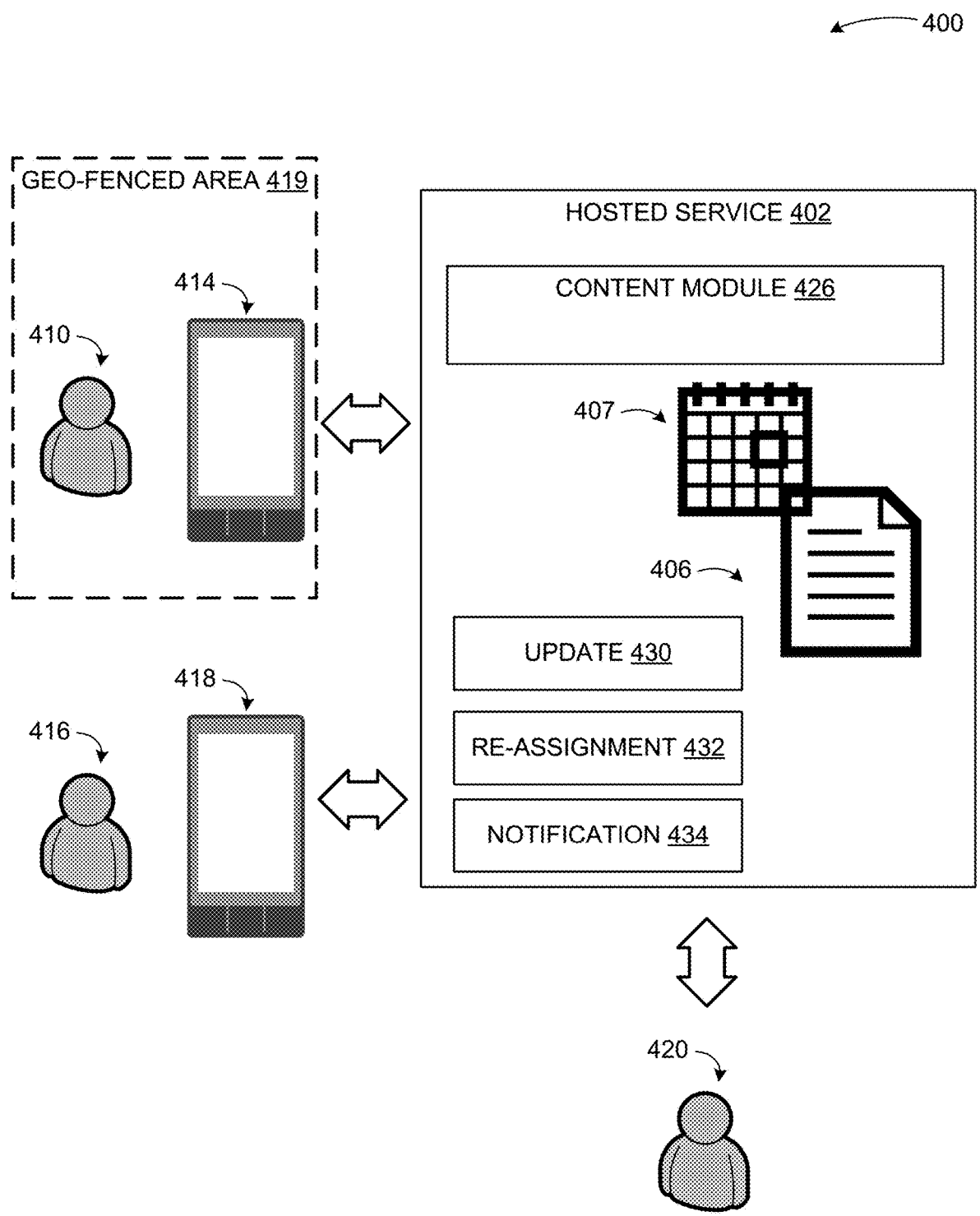
FIG. 4 is a display diagram illustrating dynamic content management based on spatial and temporal information, according to embodiments.

FIG. 4 is a display diagram illustrating dynamic content management based on spatial and temporal information, according to embodiments.

As shown in a diagram 400, a content module 426 of a hosted service 402 may manage an access to a content 406 based on spatial and location information associated with a user, received from a client interface of the hosted service 402 rendered by a client device 414. The spatial and location information associated with the user 410 (tracked by the client device 414) may be used to grant the access to the content 406 during a time-slot of the task 407 assigned to the user 410. In an example scenario, the content module 426 may receive an update to the task 407 from a manager 420 of the user 410. The manager 420 may provide a schedule of the user 410 that includes the task 407. The update 430 may include instruction(s) to revoke an access to the content 406 granted to the user 410. In response to the update 430, the content module 426 may instruct the client interface to revoke the access to the content 406 granted to the user 410.

In an example scenario, The content module 426 may receive a re-assignment instruction 432 from a manager 420 of the user 410 to re-assign the task 407 to other user 416. Alternatively, the content module 426 may receive a re-assignment request from the user 410 to re-assign the task 407 of the other user 416. In response to the re-assignment instruction 432 (or the re-assignment request by the user 410), the content module 426 may determine an availability of the other user 416 (by processing a calendar of the other user 416) and an ability of the other user 416 to perform the task 407 (whether the other user lists skill(s) in his/her profile to perform the task 407). Upon confirming the availability and the ability of the other user 416, the content module 426 may re-assign the task to the other user 416 and grant an access to the content 406 to the other user 416 by providing the content to a client interface of the hosted service 402 rendered by a client device 418. The client device 418 may be associated with the other user 416. The client interface may provide the content 406 to the other user 416. The content module 426 may also revoke the access to the content 406 granted to the user 410 based on an instruction by the manager 420, by default, and/or or based on rule(s) associated with access to the content 406 (and other content).

Furthermore, the content module 426 may report a status associated with access to the content 406 to the manager 420. For example, the content module 426 may transmit a report containing access information associated with the content 406 and the user 410 (and/or the other user 416) to the manager 420 in a notification 434. The report may include access time, duration, type (read, write and/or copy), and/or other access related information. Automated or manual operations to grant and/or revoke access to the content may also be reported in the notification 434 to the manager 420.

As discussed above, the hosted service may be employed to perform operations to automate content management based on spatial and temporal information. An increased performance and efficiency improvement with the hosted service 102 may occur as a result of tracking spatial and temporal information of a user through a client device and managing an access to a content based on restrictions related to the spatial and temporal information. Additionally, dynamically managing access to the content based on spatial and temporal information associated with the user, by the hosted service 102, may reduce processor load, increase processing speed, conserve memory, and reduce network bandwidth usage.

Embodiments, as described herein, address a need that arises from a lack of efficiency to provide content management based on spatial and temporal information. The actions/operations described herein are not a mere use of a computer, but address results that are a direct consequence of software used as a service offered to large numbers of users and applications.

The example scenarios and schemas in FIG. 1 through 4 are shown with specific components, data types, and configurations. Embodiments are not limited to systems according to these example configurations. Providing content management based on spatial and temporal information may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
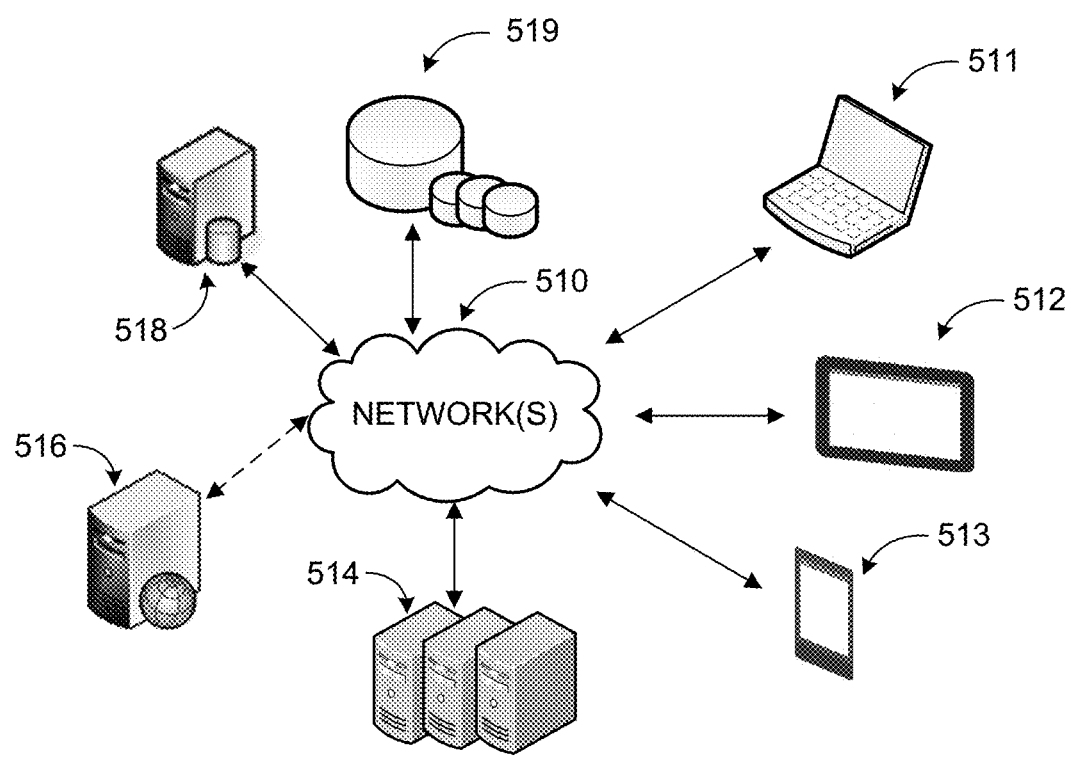
FIG. 5 is a simplified networked environment, where a system according to embodiments may be implemented.

FIG. 5 is an example networked environment, where embodiments may be implemented. A hosted service configured to provide content management may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A hosted service may receive a location of a client device and an identifier associated with a user of the client device. A schedule of the user may be processed to identify a geo-fenced area assigned to the user during a designated time-period. Upon detecting the location of the client device as within the geo-fenced area during the designated time-period, the content may be provided to the client device. The hosted service may store data associated with the content in data store(s) 519 directly or through database server 518.

Network(s) 510 may comprise any topology of server(s), client(s), Internet service provider(s), cloud based service provider(s), and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide content management based on spatial and temporal information. Furthermore, the networked environments discussed in FIG. 5 are for illustration purposes only. Embodiments are not limited to the example applications, modules, or processes.

Figure 6:
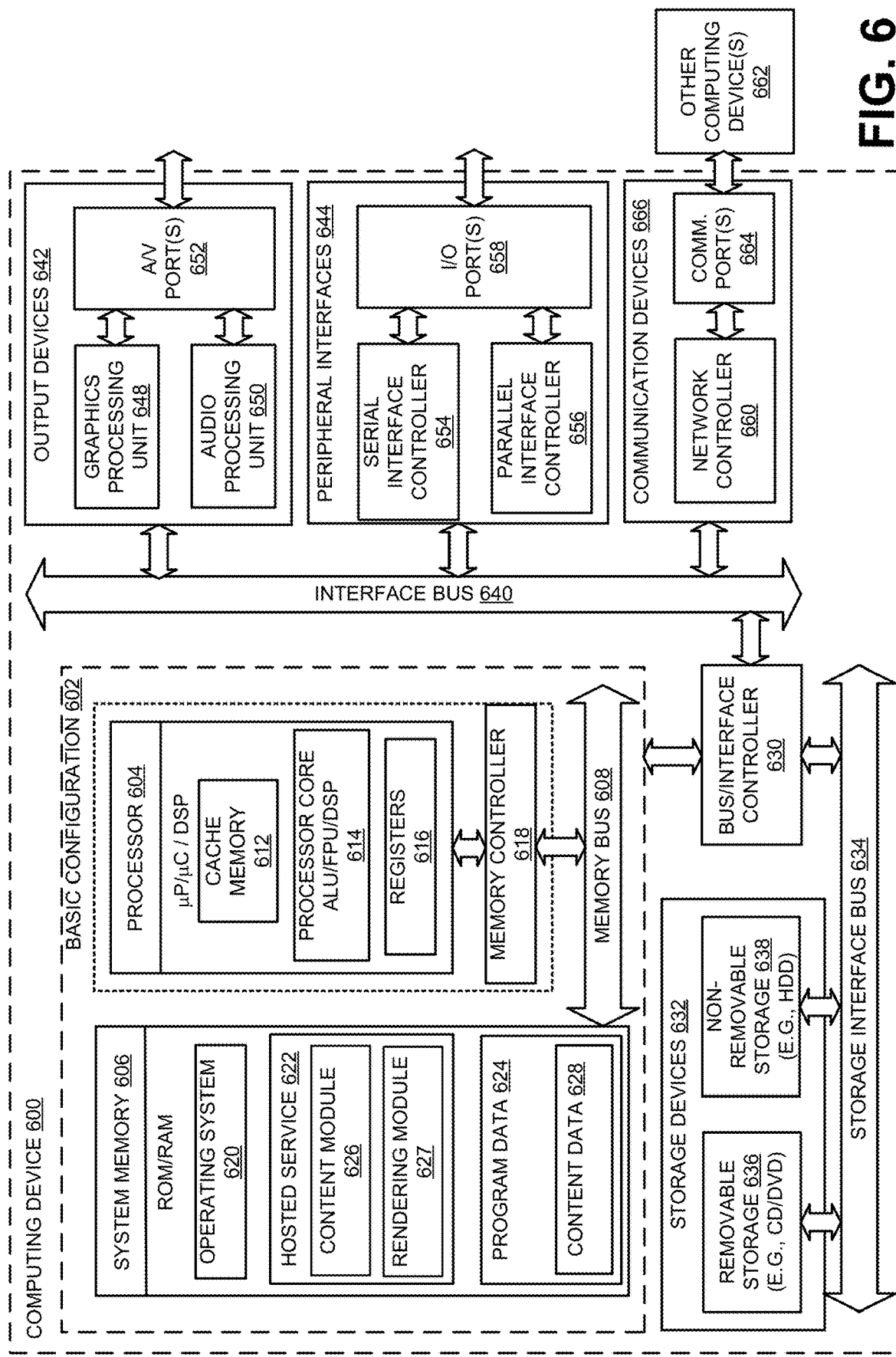
FIG. 6 is a block diagram of an example computing device, which may be used to provide content management based on location and temporal information, according to embodiments.

FIG. 6 is a block diagram of an example computing device, which may be used to provide content management based on spatial and temporal information, according to embodiments.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor ($\mu P$), a microcontroller ($\mu C$), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), a graphics processing unit (GPU), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a hosted service 622, and a program data 624. The hosted service 622 may include a component such as a content module 626 and a rendering module 627. The content module 626 and the rendering module 627 may execute the processes associated with the hosted service 622. The content module 626 may receive a location of a client device and an identifier associated with a user of the client device. A schedule of the user may be processed to identify a geo-fenced area assigned to the user during a designated time-period. Upon detecting the location of the client device as within the geo-fenced area during the designated time-period, the rendering module 627 may provide the content to the client device.

Input to and output out of the hosted service 622 may be transmitted through a communication module associated with the computing device 600. An example of the communication module may include a communication device 666 that may be communicatively coupled to the computing device 600. The communication module may provide wired and/or wireless communication. The program data 624 may also include, among other data, content data 628, or the like, as described herein. The content data 628 may include location information, biometric identifier, and/or access restriction, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example of the communication device(s) 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations. Additionally, the computing device 600 may include specialized hardware such as an application-specific integrated circuit (ASIC), a field programmable gate array (FPGA), a programmable logic device (PLD), and/or a free form logic on an integrated circuit (IC), among others.

Example embodiments may also include methods to provide content management based on spatial and temporal information. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
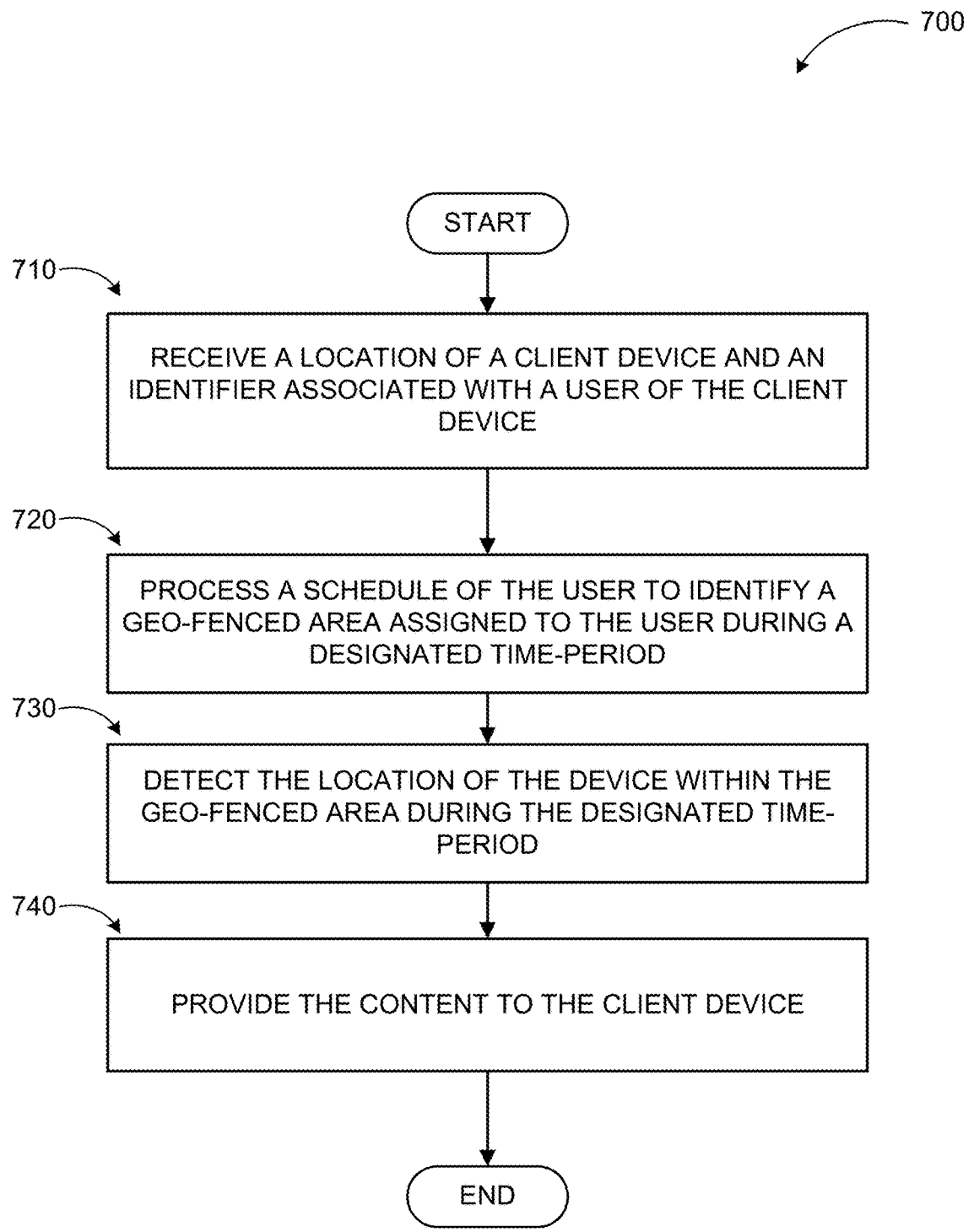
FIG. 7 is a logic flow diagram illustrating a process for providing content management based on location and temporal information, according to embodiments.

FIG. 7 is a logic flow diagram illustrating a process for providing content management based on spatial and temporal information, according to embodiments. Process 700 may be implemented on a computing device, such as the computing device 600 or another system.

Process 700 begins with operation 710, where the hosted service may receive a location of a client device and an identifier associated with a user of the client device. An example of the user identifier may include a biometric identifier which may be used to authenticate the user. At operation 720, a schedule of the user may be processed to identify a geo-fenced area assigned to the user during a designated time-period. The schedule may be provided by a manager of the user. The geo-fenced area may be provided as a property of a task assigned to the user on the schedule.

Next, at operation 730, the location of the client device may be compared to the geo-fenced area to detect the location as within the geo-fenced area during the designated time-period. A presence of the user within the geo-fenced area during the designated time-period may be correlated to activity(s) performed in service of the task on the schedule. Upon verifying the location of the user (as within the geo-fenced area during the designated time-period), the content may be provided to the client device at operation 740.

The operations included in process 700 is for illustration purposes. Providing content management based on spatial and temporal information may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

In some examples a method executed on a computing device to provide content management based on spatial and temporal information is described. The method includes receiving a location of a client device and an identifier associated with a user of the client device, processing a schedule of the user to identify a geo-fenced area assigned to the user during a designated time-period, detecting the location of the client device within the geo-fenced area during the designated time-period, and providing a content to the client device.

In other examples, the method further includes receiving a recording time coinciding with a determination of the location of the client device and identifying a task assigned to the user within the schedule, where the task spans a time-slot that encompasses the recording time and the time-slot is detected as within the designated time-period. The method further includes identifying the geo-fenced area as a property of the task and verifying the location of the client device as within the geo-fenced area during the time-slot.

In further examples, the method further includes verifying an access to the content granted to the user during the time-slot of the task and in response to detecting a protection scheme applied to the content that restricts the access to the content, disabling the protection scheme. The access to the content granted to the user is a property of the task. The access to the content granted to the user includes one or more of a read access, a write access, and a copy access.

In other examples, the method further includes detecting an expiration of the time-slot of the task, verifying the access to the content granted to the user as restricted based on the time-slot of the task, and instructing the client device to remove the access to the content granted to the user. The method further includes receiving an updated location of the client device, detecting the updated location of the client device as outside the geo-fenced area, verifying the access to the content granted to the user as restricted to the geo-fenced area, and instructing the client device to remove the access to the content granted to the user.

In further examples, the method further includes receiving a biometric identifier of the user as the identifier associated with the user, retrieving a biometric information of the user from a profile of the user hosted by a personnel data source, and verifying the biometric identifier as matching the biometric information of the user. The method further includes identifying an access to the content that is restricted based on a verification of the biometric identifier of the user and granting the user the access to the content.

In other examples, the method further includes detecting a temporary absence of the location of the client device within the geo-fenced area during the time-slot of the task and transmitting a first instruction to the client device to revoke the access granted to the user. The method further includes, the method further includes re-detecting the location of the client device within the geo-fenced area during the time-slot of the task, transmitting a second instruction to the client device to prompt the user to rescan the biometric identifier, receiving a re-scanned biometric identifier of the user, matching the re-scanned biometric identifier of the user to the biometric information of the user, and re-granting the user the access to the content.

In some examples, a server configured to provide content access management based on spatial and temporal information is described. The server includes a communication module configured to facilitate communication between a hosted service and a client device that captures the spatial and temporal information, a memory configured to store instructions, and a processor coupled to the memory and the communication module. The processor executes the hosted service in conjunction with the instructions stored in the memory. The hosted service includes a content module and a rendering module. The content module is configured to receive a location of the client device and a biometric identifier associated with a user of the client device, process a schedule of the user to identify a task assigned to the user with a geo-fenced area and a time-slot as a property of the task, detect the location of the client device within the geo-fenced area during the time-slot associated with the task, retrieve a biometric information of the user from a profile of the user hosted by a personnel data source, and verify the biometric identifier as matching the biometric information of the user. The rendering module is configured to provide the content to the client device.

In other examples, the content module is further configured to detect an access to the content restricted based on a first type of work, identify a second type of work as other property of the task, match the first type of work to the second type of work, and grant the user the access to the content. The content module is further configured to encrypt the content to the client device and transmit the encrypted content to the client device with an instruction to store in a local cache of the client device. Providing the content to the client device includes one or more operations to transmit a decryption instruction to the client device to prompt the client device to decrypt the content and render the content to the use.

In further examples, the content module is further configured to receive an update to the task from a manager of the user, where the update revokes an access to the content granted to the user, revoke the access to the content granted to the user, and instruct the client device to remove the content. The content module is further configured to receive an instruction from a stakeholder to assign other user an access to the content during other task, receive other location of other client device and other biometric identifier associated with the other user of the other client device, process the other task to identify other geo-fence area as a property of the other task, verify the other location of the other client device as within the other geo-fenced area, verify other biometric identifier as matching other biometric information of the other user retrieved from other profile of the other user hosted by the personnel data source, and prompt the rendering module to provide the content to the other user.

In some examples, a method executed on a computing device to provide content management based on spatial and temporal information is described. The method includes actions that are similar to actions provided by the content module and the rendering module of the hosted service provided by the server.

In other examples, the method further includes receiving an instruction from a manager of the user to re-assign the task to other user, verifying other location of other client device associated with other user as within the other geo-fenced area, verifying other biometric identifier of the other user received from the other client device as matching other biometric information of the other user retrieved from other profile of the other user hosted by the personnel data source, and providing the content to the other user.

In some examples, a means for providing content management based on spatial and temporal information is described. The means for provide content management based on spatial and temporal information includes a means for receiving a location of a client device and an identifier associated with a user of the client device, a means for processing a schedule of the user to identify a geo-fenced area assigned to the user during a designated time-period, a means for detecting the location of the client device within the geo-fenced area during the designated time-period, and a means for providing a content to the client device.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method performed by a data processing system for providing content management, the method comprising:
    receiving a location of a client device and an identifier associated with a user of the client device;
    parsing schedule data representing a schedule of the user to identify a task assigned to the user;
    based on the identified task, identifying designated content for the task;
    determining, based on the task assigned to the user, a geo-fenced area for performing the task;
    determining that the location of the client device is within the geo-fenced area;
    verifying an identity of the user; and
    causing access to be enabled for the designated content on the client device in response to verifying the identity of the user and determining that the location of the client device is within the geo-fenced area for performing the task.

2. The method of claim 1, further comprising:
    determining, from the task assigned to the user, a designated time period for performing the task;
    wherein causing access to be enabled comprises causing access to be enabled for the designated content on the client device in response to verifying the identity of the user and determining that the location of the client device is within the geo-fenced area during the designated time period.

3. The method of claim 2, further comprising:
    determining that a present time is no longer within the designated time period; and
    transmitting an instruction to the client device to cause access to be disabled for the designated content on the client device.

4. The method of claim 1, wherein the identifier is a biometric identifier, and wherein verifying the identity of the user comprises:
    retrieving a stored identifier of the user from a profile of the user hosted by a data source; and
    verifying the biometric identifier matches the stored identifier.

5. The method of claim 1, further comprising:
    receiving a first updated location of the client device;
    detecting the first updated location is not within the geo-fenced area; and
    transmitting a first instruction to the client device to cause access to be disabled for the designated content on the client device.

6. The method of claim 5, further comprising:
    receiving a second updated location of the client device;
    detecting the second updated location is within the geo-fenced area; and
    transmitting a second instruction to the client device to cause access to be re-enabled for the designated content on the client device.

7. The method of claim 1, wherein causing access to be enabled for the designated content comprises:
    encrypting the designated content;
    transmitting the encrypted designated content to the client device prior to verifying the identity of the user; and
    transmitting a decryption instruction to the client device to cause decryption of the encrypted designated content in response to verifying the identity of the user.

8. The method of claim 1, wherein the designated content comprises one or more of a data file or an application.

9. A system for providing content management, the system comprising:
    one or more hardware processors;
    a memory, storing instructions, which when executed, cause the one or more hardware processors to perform operations comprising:
        receiving a location of a client device and an identifier associated with a user of the client device;
        parsing schedule data representing a schedule of the user to identify a task assigned to the user;
        based on the identified task, identifying designated content for the task;
        determining, based on the task assigned to the user, a geo-fenced area for performing the task;
        determining that the location of the client device is within the geo-fenced area;
        verifying an identity of the user; and
        causing access to be enabled for the designated content on the client device in response to verifying the identity of the user and determining that the location of the client device is within the geo-fenced area for performing the task.

10. The system of claim 9, the operations further comprising:
    determining, from the task assigned to the user, a designated time period for performing the task;
    wherein causing access to be enabled comprises causing access to be enabled for the designated content on the client device in response to verifying the identity of the user and determining that the location of the client device is within the geo-fenced area during the designated time period.

11. The system of claim 10, the operations further comprising:
    determining that a present time is no longer within the designated time period; and
    transmitting an instruction to the client device to cause access to be disabled for the designated content on the client device.

12. The system of claim 9, wherein the identifier is a biometric identifier, and wherein the operation of verifying the identity of the user comprises:
    retrieving a stored identifier of the user from a profile of the user hosted by a data source; and
    verifying the biometric identifier matches the stored identifier.

13. The system of claim 9, the operations further comprising:
    receiving a first updated location of the client device;
    detecting the first updated location is not within the geo-fenced area; and
    transmitting a first instruction to the client device to cause access to be disabled for the designated content on the client device.

14. The system of claim 13, the operations further comprising:
    receiving a second updated location of the client device;
    detecting the second updated location is within the geo-fenced area; and
    transmitting a second instruction to the client device to cause access to be re-enabled for the designated content on the client device.

15. The system of claim 9, wherein the operation of causing access to be enabled for the designated content comprises:

encrypting the designated content;

transmitting the encrypted designated content to the client device prior to verifying the identity of the user; and transmitting a decryption instruction to the client device to cause decryption of the encrypted designated content in response to verifying the identity of the user.

16. The system of claim 9, wherein the designated content comprises one or more of a data file or an application.

17. A data processing system for providing content management, the data processing system comprising:

means for receiving a location of a client device and an identifier associated with a user of the client device;

means for parsing schedule data representing a schedule of the user to identify a task assigned to the user;

means for identifying designated content for the task based on the identified task;

means for determining, based on the task assigned to the user, a geo-fenced area for performing the task;

means for determining that the location of the client device is within the geo-fenced area;

means for verifying an identity of the user; and means for causing access to be enabled for the designated content on the client device in response to verifying the identity of the user and determining that the location of the client device is within the geo-fenced area for performing the task.

18. The data processing system of claim 17, further comprising:

means for determining, from the task assigned to the user, a designated time period for performing the task;

wherein the means for causing access to be enabled comprises means for causing access to be enabled for the designated content on the client device in response to verifying the identity of the user and determining that the location of the client device is within the geo-fenced area during the designated time period.

19. The data processing system of claim 17, wherein the identifier is a biometric identifier, and wherein the means for verifying the identity of the user comprises:

means for retrieving a stored identifier of the user from a profile of the user hosted by a data source; and means for verifying the biometric identifier matches the stored identifier.

20. The data processing system of claim 17, wherein the means for causing access to be enabled for the designated content comprises:

means for encrypting the designated content;

means for transmitting the encrypted designated content to the client device prior to verifying the identity of the user; and means for transmitting a decryption instruction to the client device to cause decryption of the encrypted designated content in response to verifying the identity of the user.

\* \* \* \* \*